Aug. 3, 1954
J. E. MORRA
2,685,483
SHAFT BEARING
Filed Sept. 3, 1952
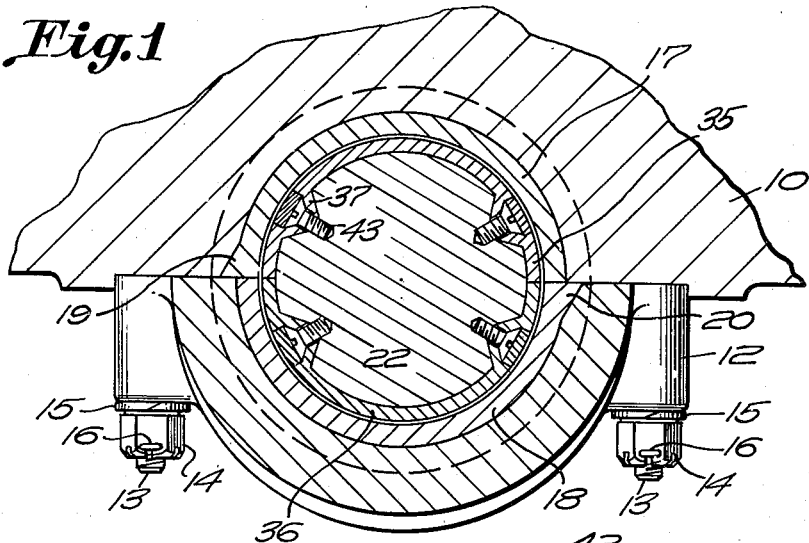
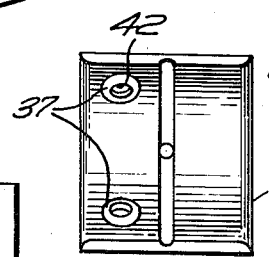
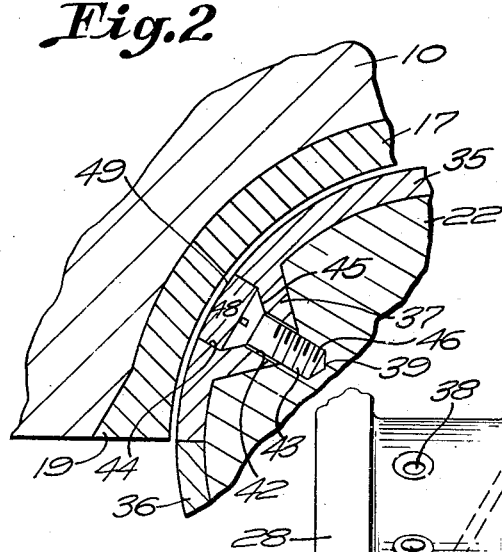
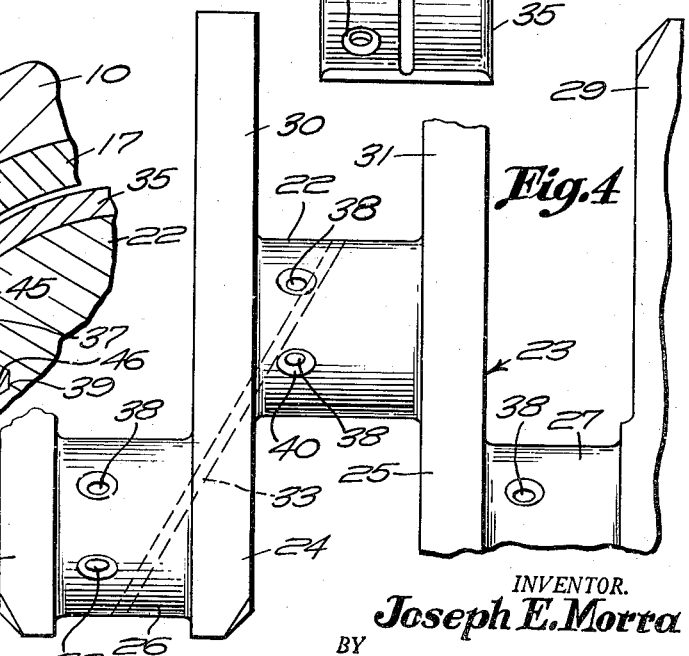
INVENTOR.
Joseph E. Morra
BY
W. Russell Greenwood
ATTORNEY Patented Aug. 3, 1954

2,685,483

UNITED STATES PATENT OFFICE 2,685,483

SHAFT BEARING

Joseph E. Morra, Cranston, R. I.

Application September 3, 1952, Serial No. 307,693

4 Claims. (Cl. 308—237)

This invention relates in general to improvements in shaft bearings and, in particular, to bearings of the type embodying replaceable bearing surfacing elements which are attached to the journal portions of a rotary shaft such as, for example, an automotive crankshaft for providing a renewable bearing surface for the main crank journals and crankpins when excessive wear of the bearing surfaces thereof has taken place or whenever they have become damaged by failure of the bearing due to "burned-out" bearing liners.

It is the general object of the invention to provide an improved bearing construction of the foregoing type which will be so constructed that the replaceable bearing surfacing elements surrounding the shaft journal will be more susceptible to injury or failure or will suffer greater wear in use than the outer bearing elements within which the journal has relative rotative movement, thus requiring renewal of the journal elements only in most instances.

As is well known, in modern high speed automotive types of internal combustion engines the main bearings for the crankshaft and the crankpin bearings for the big ends of the connecting rods are of the so-called replaceable "shell" type. These bearings, as conventionally constructed, are of two types, the plain and the flanged type, made in the form of a longitudinally split cylindrical shell, each half of which is substantially semi-cylindrical. These semi-cylindrical shells or shape-maintaining rigid backing members are usually thin-walled made of bronze or of a low-carbon steel, tinned and lined with any of the conventional bearing alloys, usually babbitt. The crankcase section of the engine block usually includes therein suitable bearing supports each provided with a removable cap providing in their assembled position opposed arcuate bearing seats forming a cylindrical bore for the reception of the bearing shells for the main crank journals. Similarly, the big end of each connecting rod is provided with a removable cap providing, at assembly, opposed arcuate bearing seats forming a cylindrical opening for accommodating the bearing shells for a crankpin. The bronze-back bearing shells are usually anchored in the bearing seats and caps by means of locking screws or dowels but the steel-back bearing shells are anchored by means of spurs which are stamped from the steel backing of the shells and accommodated within milled slots in the respective bearing seats and caps. The crank journals and crankpins usually are hardened and thus turn with respect to bearing shells of the type just described whose bearing surfaces have softer bearing qualities.

It is found, however, that after extended or particularly severe use, these bearings frequently fail or become seriously damaged by overloading and must be replaced. In the case of a severe overload, or if the lubrication of the bearing surfaces fails for any reason while the engine is running, the load on the bearing becomes a factor in the friction loss, and any further increase in it results in excessive heating to cause the babbitt liners to melt and, in many instances, to be accompanied by seizure of the bearing, and the bearing is said to have "burned out." This bearing failure usually involves some injury to the bearing surfaces of the journals which turn in the bearings thus affected, so that if the bearing shells are replaced without the particular journal being refinished, the new bearing is short-lived. Furthermore, the bearing surfaces of the crank journals and the crankpins suffer wear caused by use, or become otherwise damaged when the bearing loads are high or excessive, so that they will not operate satisfactorily any longer and must be reconditioned.

The reconditioning and repair of the bearing surfaces of automotive crankshafts accordingly represents a frequently occurring and expensive maintenance job the expense of which can be reduced very substantially if these worn or damaged bearing surfaces, crank journals and/or crankpins can be readily and satisfactorily replaced individually without necessitating the removal of the entire crankshaft from its position in the engine.

It is, therefore, an important object of the present invention to provide a replaceable bearing construction adapted for use with crankshafts and various other types of shafts which rotate in bearings of a longitudinally split design in which the fixed or stationary bearing elements are constructed of a hard material and the shaft portion which is journaled therein has an outer replaceable covering having softer bearing qualities than the bearing surfaces of the surrounding bearing elements.

A further object of the present invention is to provide a bearing of the character above-mentioned which is of simple, inexpensive and practical construction, efficient and reliable in its operation, and otherwise will be well adapted for the purposes for which the same is intended.

The invention will be more readily understood by reference to the following detailed description when read in connection with the accompanying drawings, and the novel features will be particularly pointed out in the appended claims.

In the drawings:

Fig. 1 is a fragmentary cross-sectional view of a center main bearing for the crankshaft of an internal combustion engine embodying the present invention and also showing the center main crank journal in position therein;

Fig. 2 is a fragmentary sectional view, on greatly enlarged scale, of a portion of the bearing illustrated in Fig. 1 showing the method of fastening one of the replaceable bearing surfacing elements to the main crank journal shown in Fig. 1;

Fig. 3 is a side elevation as viewed from the inside of one of the pair of removable bearing surfacing elements which are attached to the main crank jounral shown in Fig. 1; and Fig. 4 is a fragmentary longitudinal view of a portion of an automotive crankshaft showing a pair of crankpins and the center main crank journal to which a pair of replaceable bearing surfacing elements of this invention are to be applied.

Referring now to the drawings wherein the present invention is shown, for the purposes of illustration only, in connection with the center main bearing for a three-bearing six-cylinder automotive crankshaft; a fragmentary portion of the usual crankshaft center main bearing support of the engine block is indicated generally by the numeral 10 and has secured thereto a removable cap 12 which is clamped to the bearing support 10 in a conventional manner by means of bolts 13 and castellated nuts 14. Conventional lock washers 15 may be provided on the bolts 13 between the cap 12 and the nuts 14, and suitable cotter-pins 16 extending through holes in the bolts 13 may be used to retain the nuts 14 in adjusted position on the bolts 13.

Received within the respective bearing seats of the bearing support 10 and the cap 12 are the upper and lower semi-cylindrical bearing sleeve elements or liners 17 and 18 respectively which are anchored by means of suitable spurs 19 and 20 to the bearing support 10 and the cap 12 respectively. The spurs 19 and 20 are accommodated within suitable slots milled in the respective bearing seats of the bearing support 10 and the cap 12, as illustrated in Figs. 1 and 2. The spurs locate the bearing elements or liners 17 and 18 endwise in their respective arcuate bearing seats and also restrain the particular liners from circumferential motion therein. The spurs 19 and 20 on the two halves of these bearing members are offset from each other diametrically of the bearing and oppose each other in the circumferential direction, as shown in Fig. 1.

The bearing elements 17 and 18 are here shown as being of the type having thrust flanges at the ends thereof but instead may be of the plain type without flanges if so desired. As illustrated, the two semi-cylindrical sleeve elements 17 and 18 are arranged in the bearing support 10 and the cap 12 respectively and clamped together with the opposed edges of the sleeve halves in abutting relation and their semi-cylindrical inner surfaces in opposed relationship to form an annular bearing as shown in Fig. 1 providing a complete cylindrical opening for the reception of the center main crank journal 22 of an automotive crankshaft 23 of which a fragmentary side view thereof is illustrated in Fig. 4. Mention is here made that crankshafts for six-cylinder in-line engines are formed with either three, four, or seven main journals but, as above mentioned, the three-bearing crankshaft has been selected for illustration in the present instance merely for illustrative purposes only in order to simplify the detailed description thereof of the invention. As illustrated in Fig. 4, the crankshaft 23 has short arms 24 and 25 connecting the crankpins 26 and 27 with the adjacent center main crank journal 22 and long arms 28 and 29 connecting the two crankpins (not shown) spaced 120° apart to the crankpins 26 and 27 respectively. The short crankarms 24 and 25 are each provided with the usual integral counterweight portions 30 and 31 respectively. In engines provided with pressure lubrication, single inclined oil holes are drilled through the main crank journals, arms, and crankpins to permit oil flow from the main to the crankpin bearings, one such inclined oil hole being indicated in dotted outline at 33 in Fig. 4.

Each of the bearing sleeve elements 17 and 18 is preferably formed of hardened steel or a hard metallic alloy capable of providing satisfactory bearing qualities in service and of forming bearing surfaces harder and considerably more wear-resistant than the bearing surface of the shaft journal which is supported by these sleeve elements and has relative rotative movement in the annular bearing formed thereby. In practice, the effective diameter of the half sleeve elements 17 and 18 when in free state is preferably slightly greater than the diameter of the bores forming the respective bearing seats for these bearing sleeves in the support 10 and the cap 12 so that preferably as illustrated in Fig. 1, the halves may not be freely put in place in their respective bearing seats in the support 10 and the cap 12 but the free edges of the sleeve halves must be sprung towards each other a slight amount in order to enable the sleeve half to be snapped into position in its corresponding half of the bearing bore. This practice is desirable in order to insure a relatively tight fit between the inner surface of each sleeve half and the cooperating walls of its bearing seat thereby eliminating any spacing of the outer surface of the sleeve halves 17 and 18 from their respective arcuate bearing seats which would permit the sleeve elements to yield in service. The relative circumference of each sleeve half is such that when the cap 12 is in position and the cap nuts 14 are tightened up, the bearing is put under compression and each sleeve half is pulled tightly in place as illustrated in Fig. 1 and the opposed edges of the sleeve halves abut to cause the halves to be firmly expanded into contact with its bearing seat. This gives good contact over the entire interface of the bearing and its seat and consequently good heat flow.

The main journal 22 of the crankshaft 23, as illustrated in Fig. 1, carries a pair of replaceable bearing surfacing elements or sleeve members 35 and 36, each of substantially semi-cylindrical form, and fitted to the cylindrical bearing surface of the main crank journal 22 providing thereon a longitudinally divided two-piece sleeve of the desired outer diameter with its parting lines disposed in a diametrical plane containing the axis of the crank journal 22 of the crankshaft 23.

The bearing surfacing elements or sleeve members 35 and 36 are formed of suitable metallic alloy capable of providing bearing surfaces on the journals softer than the cooperating hard bearing surfaces of the sleeve elements 17 and 18 respectively, and these shells are preferably formed of any of the principal babbitt bearing-alloy compositions whose specifications have been standardized by the Society of Automotive Engineers (hereinafter referred to as S. A. E.) for cast products such as, for example, the tin-base babbitts S. A. E. Nos. 10, 11 or 12; or the lead-base babbitts S. A. E. Nos. 13 or 14.

Interlocking means are provided between the sleeve members 35 and 36 and the adjacent surface of the shaft journal serving the dual purpose of positioning each of the sleeve members 35 and 36 individually in its proper location angularly with respect to the outer circumferential surface of the shaft journal where it will be best suited to receive the shock forces incident to the explosions in the cylinders of the engine as well as providing a socket or housing completely enclosing the fastening means by which the sleeve members 35 and 36 are detachably secured to the shaft journal to provide thereon the annular outer facing or covering which forms the bearing surface proper of the shaft journal that turns within the longitudinally divided two-piece annular outer bearing formed by the hard bearing elements 17 and 18. To this end, hollow frusto-conical projections 37 are provided which project radially outwardly from the inner semi-cylindrical face of each of the sleeve members 35 and 36 and are formed integral therewith. The outer circumferential surface of the journal 22 is provided with holes 38 which are drilled radially inwardly therefrom and disposed in pairs at opposite sides of the journal 22, the upper hole of each pair being diametrically opposite the lower hole of the pair at the opposite side of the journal. The holes 38 are each formed with an inner internally threaded bore 39 of small diameter leading inwardly of the journal from a wide conical mouth or counter-bored recess 40 formed in the outer circumferential surface of the journal 22 for receiving one of the projections 37. The holes 38 are so spaced circumferentially of the shaft journal that all of the radial frusto-conical projections 37 will project into and interfit with a confronting recess 40 of correspondingly conical form to interlock therewith when the bearing sleeve halves 35 and 36 are assembled about the shaft journal 22, as illustrated in Fig. 1. Suitable fastening means, here shown as screws 43, are provided each adapted to pass through an axial bore in the projections 37 and having screw-threaded connection with the threaded holes 38 in the journal to detachably secure these sleeve elements thereto. As shown in Figs. 1 and 2, the axial bores 42 through the projections 37 each have a wide cylindrically recessed or counterbored mouth 44 whose depth is substantially equal to the wall thickness of its particular sleeve element 35 or 36 and tapering therefrom to provide a conical seating portion 45 connecting the coaxial lower bore 46 whose diameter is slightly larger than that of the threaded shank of the screw 43 so that the latter may readily pass therethrough into threaded engagement with the internal threads of the confronting tapped hole 39 in the shaft journal.

From the foregoing description, it will be seen that I have provided a novel bearing capable of use for shaft journals and particularly for use with the main journals and/or crankpins of automotive crankshafts wherein the wear receiving surfaces of the journal portion is less wear-resistant and has softer bearing qualities than the surrounding bearing surfaces within which the journal member turns and consequently most of the wear or damage in use will be received by these replaceable sleeve elements covering the journal member and thus can be readily and easily replaced without requiring, in many instances, the replacement of the hardened bearing sleeve elements 17 and 18, or removal of the entire crankshaft from its operating position in the engine.

In order to cover the sunken heads of the fastening screws 43 after assembly and attachment of the sleeve members 35 and 36 to the shaft journal 22, cylindrical cap members or plugs 48 are provided each being removably accommodated within the outwardly opening recessed mouth portions 44 of the bores 42 of the projections 37 and formed of the same babbitt alloy or of the same soft bearing alloy as that employed in the construction of the sleeve members if other than a babbitt material is used therefor. As shown in Figs. 1 and 2, the tops of the cap members or plugs 48 are of cylindrically convex form as indicated at 49 and lie flush with the outer circumferential surface of the associated sleeve member 35 or 36 for providing a smooth continuously cylindrical surface coextensive therewith.

It is, of course, to be understood that the bearing journal sleeve members 35 and 36 are precision elements which in the process of manufacture will be made in pairs and will be finished to the desired outer diameter by grinding on the outside while the two halves are in assembled positions upon a master arbor of corresponding diameter and length as the crankshaft main journal or crankpin, as the case may be, whose bearing surfacing elements require replacement.

It is to be further understood that the diameter of the cylindrical opening or bore within which the shaft journal is mounted and formed by opposed inner arcuate bearing surfaces of the bearing sleeve elements 17 and 18 is made slightly larger than the outer diameter of the shaft journal together with its sleeve members 35 and 36 to form an annular clearance space (see Fig. 1) which provides for rotative movement of the shaft journal in said bore and also to allow for flow therethrough of a film of lubricating fluid.

What is claimed is:

1. In a shaft bearing, in combination with a shaft having a journal portion, a pair of opposed semi-cylindrical sleeve elements mounted upon said journal portion and forming the outer bearing surface of said shaft journal, said sleeve elements being constructed of a soft bearing alloy capable of providing satisfactory bearing qualities in service, an outer annular longitudinally-divided bearing formed of a pair of opposed semi-cylindrical hardened bearing elements surrounding said shaft journal sleeve elements and clamped together with their opposed edges in abutting relation and their inner circumferential bearing surfaces forming a complete cylindrical bore rotatably mounting said shaft journal, the diameter of said cylindrical bore being larger than that of said shaft journal with its sleeve elements to form an annular clearance space which provides for rotative movement of said journal in said bore and allows for flow therethrough of a film of lubricating fluid, said journal sleeve elements being individually fitted to the adjacent surface portion of said shaft journal and each sleeve half thereof provided with cylindrically recessed hollow projections integral therewith projecting radially from its inner circumferential surface into and interfitting with a correspondingly shaped recess in the outer circumferential surface of said shaft journal, removable fastening means extending axially through said projections and detachably securing said sleeve elements to said shaft journal for rotation bodily therewith when the shaft is rotated, and removable plugs accommodated within the recessed portions of said projections engaging at their inner ends the tops of said fastening means and being shaped at their outer ends so as to terminate flush with the outer convex bearing surface of the associated sleeve elements and provide a smooth continuous cylindrical bearing surface coextensive with the sleeve elements.

2. In a bearing construction, in combination, a longitudinally divided two-piece annular outer bearing member constructed of a hard metal and having the two parts thereof fixed in suitable bearing seats against rotation and clamped together with their opposed edges in abutting relationship and their opposed inner arcuate bearing surfaces forming a complete cylindrical opening for accommodating a cylindrical journal member, a cylindrical journal member mounted within said cylindrical opening of said bearing member and supported by the hard inner bearing surfaces thereof for relative rotative movement thereto, said journal member having removably mounted thereon a longitudinally divided two-piece sleeve of which each of the two parts thereof is composed of a bearing alloy having relatively softer bearing qualities than the hard metal forming said outer bearing member, the outer circumferential surface of said sleeve at assembly being completely cylindrical and providing the bearing surface proper of said journal member which turns within said bearing member upon the hardened bearing surfaces thereof, interlocking means projecting radially between each sleeve element and into a correspondingly shaped recess in the adjacent supporting portion of said journal member, the interlocking means each formed with an axial bore therethrough having an enlarged outwardly opening recess portion at the outer circumferential surface of said sleeve, fastening screws having their heads wholly enclosed within the recess portions of said bores of the interlocking means and having their threaded shank portions extending therethrough into threaded connection with the adjacent recessed portion of said journal member to detachably secure the two parts of said sleeve thereto, and removable plug members formed of the same material as said sleeves and accommodated within the recessed portions of the bores of said interlocking means to cover the heads of said fastening screws, the tops of said plug members being cylindrically convex and flush with the outer circumferential surface of said sleeve to provide a smooth continuously cylindrical bearing surface coextensive therewith.

3. In a bearing construction, in combination, a longitudinally divided two-piece annular outer bearing member constructed of hardened steel and having the two parts thereof fixed in suitable bearing seats against rotation and clamped together with their opposed edges in abutting relationship and their opposed inner arcuate bearing surfaces forming a complete cylindrical opening for receiving therein a cylindrical journal member, a cylindrical journal member mounted within said cylindrical opening of said bearing member and supported by the hardened inner bearing surfaces thereof for relative rotative movement thereto, said journal member having an outer longitudinally divided two-piece sleeve of which each of the two parts thereof is composed of a babbitt alloy, the outer circumferential surface of said sleeve at assembly being completely cylindrical and providing the bearing surface proper of said journal member which turns within said bearing member upon the hardened bearing surfaces thereof, conically shaped interlocking means projecting radially between each sleeve element and into a correspondingly shaped conical recess in the adjacent supporting portion of said journal member, the interlocking means each formed with an axial bore therethrough having an enlarged outwardly opening recess portion at the outer circumferential bearing surface of said sleeve, fastening screws having their heads in seated position within the recess portions of said bores of the interlocking means and having their threaded shanks extending therethrough into threaded connection within the adjacent recessed portion of said journal member to detachably secure the two parts of said sleeve thereto, and removable plugs each formed of a babbitt alloy and accommodated within the recessed portions of the bores of said interlocking means to completely cover the heads of said fastening screws, the tops of said plugs being cylindrically convex and flush with the outer circumferential surface of said sleeve to provide a smooth continuously cylindrical bearing surface coextensive therewith.

4. A shaft having a journal portion formed with a pair of sockets of conical formation, a pair of bearing forming elements encircling the journal portion, each of said elements having hollow frusto-conical projections interfitting with said sockets, removable fastening means accommodated within said projections and extending therethrough into the shaft to detachably secure said bearing elements thereto, and removable plugs covering the tops of said fastening means and tightly fitted into the entrance openings of said projections.

References Cited in the file of this patent

UNITED STATES PATENTS

| Number | Name | Date |
|---|---|---|
| 1,317,818 | Parker | Oct. 7, 1919 |
| 1,354,259 | Lusk | Sept. 28, 1920 |
| 1,872,600 | Manning | Aug. 16, 1932 |
| 2,167,609 | Dolle | July 25, 1939 |
| 2,481,931 | Kester | Sept. 13, 1949 |

FOREIGN PATENTS

| Number | Country | Date |
|---|---|---|
| 18,789 | Great Britain | A. D. 1912 |
| 316,860 | Germany | Dec. 6, 1919 |
| 774,602 | France | Dec. 10, 1934 |